US010886865B2

(12) United States Patent
Arai

(10) Patent No.: US 10,886,865 B2
(45) Date of Patent: Jan. 5, 2021

(54) MOTOR CONTROLLER AND ELECTRIC POWER STEERING DEVICE

(71) Applicant: NIDEC ELESYS CORPORATION, Kawasaki (JP)

(72) Inventor: Takeshi Arai, Kawasaki (JP)

(73) Assignee: NIDEC ELESYS CORPORATION, Kangawa (JP)

(*) Notice: Subject to any disclaimer, the term of this patent is extended or adjusted under 35 U.S.C. 154(b) by 0 days.

(21) Appl. No.: 16/392,672

(22) Filed: Apr. 24, 2019

(65) Prior Publication Data
US 2019/0334466 A1 Oct. 31, 2019

(30) Foreign Application Priority Data

Apr. 26, 2018 (JP) ................................. 2018-085451

(51) Int. Cl.
*H02P 21/22* (2016.01)
*H02P 27/12* (2006.01)
*H02P 25/22* (2006.01)
*B62D 6/08* (2006.01)
*B62D 5/04* (2006.01)

(52) U.S. Cl.
CPC ............ *H02P 21/22* (2016.02); *B62D 5/0463* (2013.01); *B62D 6/08* (2013.01); *H02P 25/22* (2013.01); *H02P 27/12* (2013.01)

(58) Field of Classification Search
CPC ............. H02P 21/22; H02P 5/22; H02P 27/12
USPC .................................................... 318/400.02
See application file for complete search history.

(56) References Cited

U.S. PATENT DOCUMENTS

| 2011/0290580 | A1* | 12/2011 | Mukai  | B62D 5/0481 180/443 |
| 2013/0234635 | A1* | 9/2013 | Kojima | H02P 6/12 318/400.21 |
| 2013/0334995 | A1* | 12/2013 | Kuroda | B62D 5/0493 318/400.27 |
| 2014/0246999 | A1* | 9/2014 | Kezobo | B62D 5/0484 318/400.23 |
| 2015/0145448 | A1* | 5/2015 | Mukai  | B62D 5/0487 318/400.21 |
| 2016/0056750 | A1* | 2/2016 | West   | H02M 7/53871 318/490 |

(Continued)

FOREIGN PATENT DOCUMENTS

JP 2007-274849 A 10/2007

*Primary Examiner* — Kawing Chan
(74) *Attorney, Agent, or Firm* — Keating & Bennett

(57) ABSTRACT

A motor controller that controls a motor including two windings includes a calculator to compute a current instruction value to drive the motor, a first motor driver to supply a first current to one of the windings based on the current instruction value, a second motor driver to supply a second current to the other of the windings based on the current instruction value, a first current detector to detect the first current supplied to the motor from the first motor driver, and a second current detector to detect the second current supplied to the motor from the second motor driver. The calculator supplies a first forced current to the first motor driver, and a second forced current in opposite phase of the first forced current to the second motor driver to determine an abnormality of the first current detector and/or the second current detector.

9 Claims, 5 Drawing Sheets

(56) References Cited

U.S. PATENT DOCUMENTS

2017/0272009 A1\* 9/2017 Kawamura .......... B62D 5/0484
2019/0280629 A1\* 9/2019 Furukawa ................ B62D 6/00

\* cited by examiner

MOTOR CONTROLLER AND ELECTRIC POWER STEERING DEVICE

CROSS REFERENCE TO RELATED APPLICATION

This application claims the benefit of priority to Japanese Patent Application No. 2018-085451 filed on Apr. 26, 2018. The entire contents of this application are hereby incorporated herein by reference.

BACKGROUND OF THE DISCLOSURE

1. Field of the Disclosure

The present disclosure relates to a motor controller and an electric power steering device.

2. Description of the Related Art

An electric power steering device for a vehicle detects a steering torque generated in a steering shaft by handle operation and vehicle speed, and assists the steering force of the handle by driving a motor based on a detection signal. A controller including a central processing unit (CPU) controls the electric power steering device.

The controller computes the size of a current supplied to the motor based on a steering torque detected by a torque sensor and vehicle speed detected by a vehicle speed sensor, and controls the current supplied to the motor based on the computation result. The controller also acquires the actual current flowing through the motor detected by a current detector, and performs feedback control, so that the acquired current coincides with a target value computed based on the steering torque and the like.

When a failure occurs in the aforementioned current detector of the controller, the current flowing through the motor cannot be detected accurately. As a result, by continuing to control the motor with the faulty current detector, an excessively large motor driving force may be supplied to the motor. Meanwhile, when a necessary current is not supplied to the motor, sufficient motor driving force cannot be supplied to the motor in some cases. In these cases, there is a problem that the handle cannot be assisted with an optimal steering force. Hence, an initial diagnosis is performed when the controller is activated to determine whether there is an abnormality in the current detector. Then, motor drive control is started if the current detector is operating normally.

A conventional electric power steering device includes a mode in which abnormality diagnosis of a current detector is performed. In the electric power steering device, a q-axis current component which is a torque component is set to zero and a d-axis current component which is a magnetic field component is set to a constant value. Hence, the motor is not rotated, and an abnormality of the current detector is detected from a motor current detection value based on the detection result.

However, the conventional electric power steering device has the following problem. That is, when the q-axis current component which is the torque component is set to zero and the d-axis current component which is the magnetic field component is set to a constant value, even though generation of a motor torque can be avoided, the amplitude of the current may not appear, depending on the angle of each phase flowing through the motor. In this case, there is a problem that diagnosis of whether the current detector is functioning normally cannot be made.

SUMMARY OF THE DISCLOSURE

An example embodiment of the present disclosure is a motor controller that controls operation of a motor including two windings. The motor controller includes a calculator to compute a current instruction value to drive the motor, a first motor driver that drives the motor by supplying a first current to one of the windings based on the current instruction value computed by the calculator, a second motor driver that drives the motor by supplying a second current to the other of the windings based on the current instruction value computed by the calculator, a first current detector to detect the first current supplied to the motor from the first motor driver, and a second current detector to detect the second current supplied to the motor from the second motor driver. To determine an abnormality of at least one of the first current detector and the second current detector, the calculator supplies a first forced current to the first motor driver, and supplies a second forced current in opposite phase of the first forced current to the second motor driver.

The above and other elements, features, steps, characteristics and advantages of the present disclosure will become more apparent from the following detailed description of example embodiments with reference to the attached drawings.

DETAILED DESCRIPTION OF THE EXAMPLE EMBODIMENTS

Figure 1:
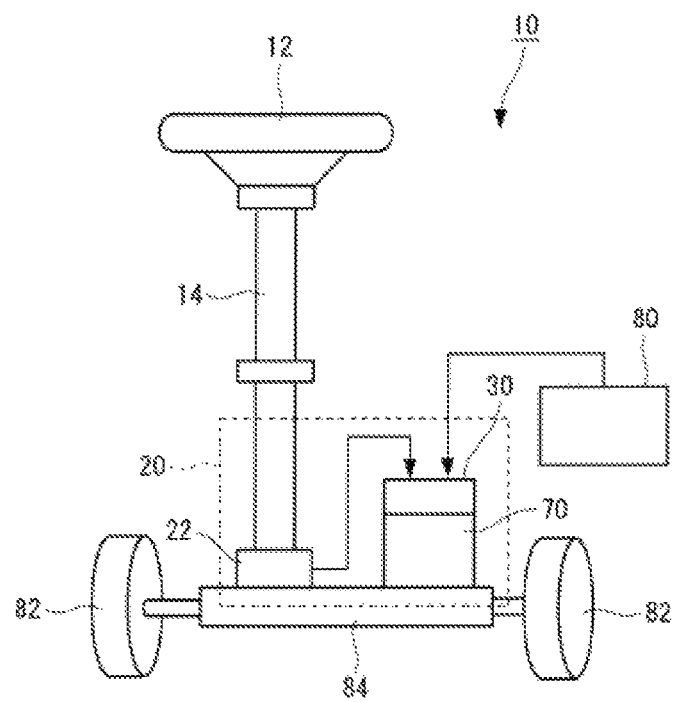
FIG. 1 is a diagram showing a schematic configuration of an electric power steering system.

Hereinafter, example embodiments of the present disclosure will be described in detail with reference to the accompanying drawings. Note that the dimensional ratio in the drawings is expanded for the sake of simple description, and may differ from the actual ratio.

FIG. 1 is a diagram showing an example of a schematic configuration of an electric power steering system 10. The electric power steering system 10 is a device that assists a driver's handle operation in a transport machine such as an automobile. As shown in FIG. 1, the electric power steering system includes a steering wheel (hereinafter also referred to as "handle") 12, an electric power steering device 20, a power supply source 80, and wheels 82.

The electric power steering device 20 has a torque sensor 22, a motor controller 30, and a motor 70. The torque sensor 22 is attached to a steering shaft 14. The torque sensor 22 detects a torque applied to the steering shaft 14 when the steering shaft 14 is rotated by the driver's operation of the steering wheel 12. A torque signal which is a detection signal of the torque sensor 22 is output to the motor controller 30 detected by the torque sensor 22.

The motor controller 30 uses electric power obtained from the power supply source 80 to supply a drive current to the motor 70 based on the torque signal input from the torque sensor 22, and thereby drives the motor 70. Note that the motor controller 30 can drive the motor 70 using not only the torque signal but also other information such as vehicle speed.

The driving force generated in the motor 70 is transmitted to the wheels 82 through a gear box 84. This varies the rudder angle of the wheel 82. Thus, the electric power steering device 20 amplifies the torque of the steering shaft 14 by the motor 70 and varies the rudder angle of the wheel 82. Accordingly, the driver can operate the steering wheel 12 with a small force.

Figure 2:
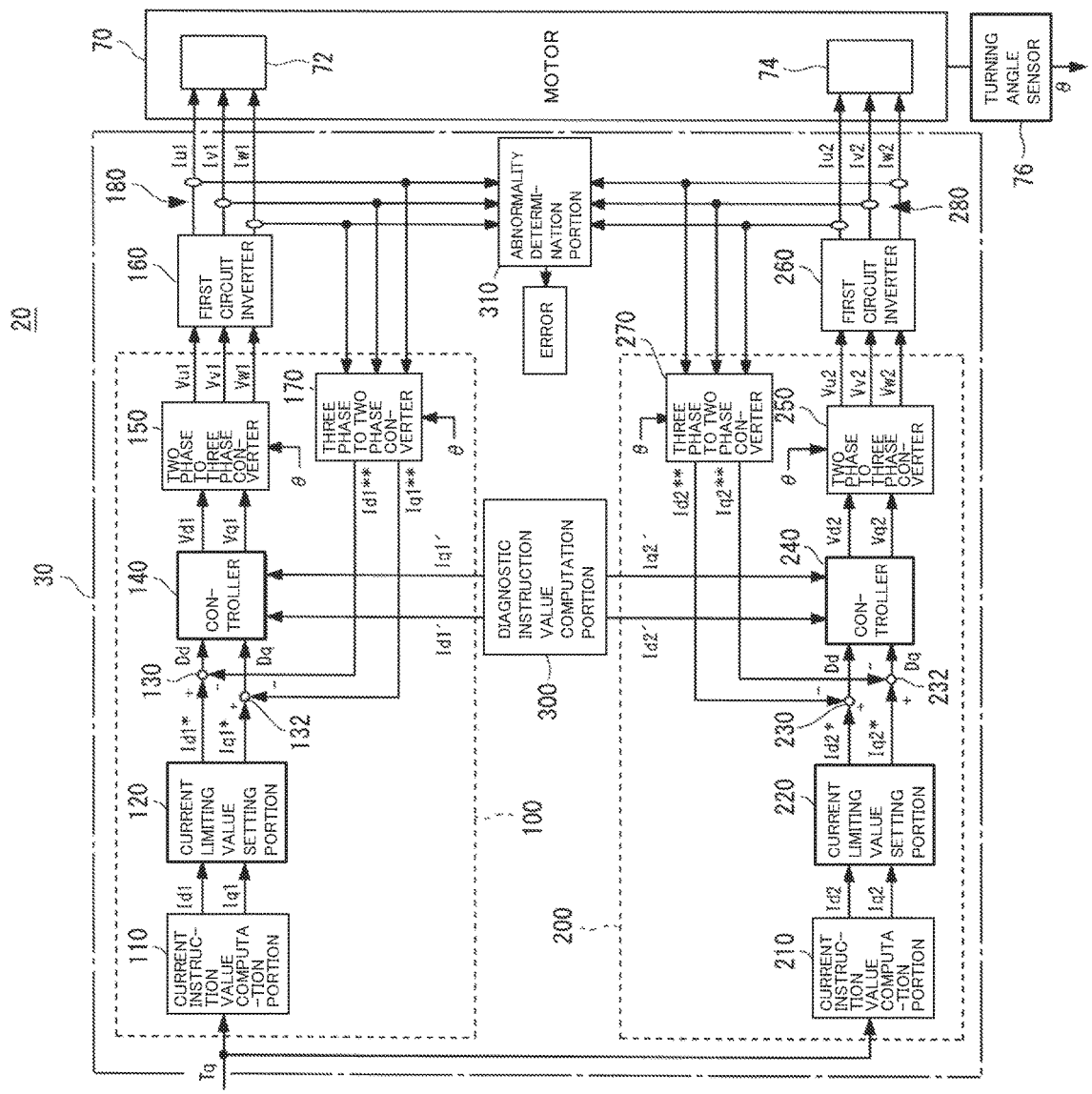
FIG. 2 is a functional block diagram of an electric power steering device.

FIG. 2 is a block diagram showing an example of a configuration of the electric power steering device 20. As shown in FIG. 2, the electric power steering device 20 includes the motor controller 30, the motor 70, and a turning angle sensor 76.

The motor controller 30 includes a microcomputer, a drive circuit, and the like, and is configured of two circuits to drive and control the double-winding motor 70. By adopting a dual circuit configuration of a redundant design, even when one circuit fails, the other circuit can continue to drive the motor 70, whereby reliability can be improved. The motor controller 30 includes a first circuit controller 100, first circuit inverter 160, and current detector 180 on the first circuit side, a second circuit controller 200, second circuit inverter 260, and current detector 280 on the second circuit side, a diagnostic instruction value computation portion 300, and an abnormality determination portion 310.

The first circuit controller 100 has a current instruction value computation portion 110, a current limiting value setting portion 120, adders 130, 132, a controller 140, a two phase to three phase converter 150, and a three phase to two phase converter 170.

The current instruction value computation portion 110 computes a d-axis current instruction value Id1 which is a magnetic field component and a q-axis current instruction value Iq1 which is a torque component, based on a steering torque signal Tq supplied from the torque sensor 22 (see FIG. 1). The computed d-axis current instruction value Id1 and q-axis current instruction value Iq1 are output to the current limiting value setting portion 120.

The current limiting value setting portion 120 sets a d-axis current instruction value Id1* as an upper limit of the d-axis current instruction value Id1 and a q-axis current instruction value Iq1* as an upper limit of the q-axis current instruction value Iq1, based on the d-axis current instruction value Id1 and q-axis current instruction value Iq1. The d-axis current instruction value Id1* is output to the adder 130, and the q-axis current instruction value Iq1* is output to the adder 132.

The three phase to two phase converter 170 performs dq transformation on three phase currents Iu1, Iv1, Iw1 detected by the current detector 180 based on an angle signal θ fed back from the turning angle sensor 76, and obtains a d-axis current value Id1 and a q-axis current value Iq1. The transformed d-axis current value Id1 is output to the adder 130, and q-axis current value Iq1 to the adder 132.

The adder 130 calculates a difference Dd between the d-axis current instruction value Id1* from the current limiting value setting portion 120 and the d-axis current value Id1** from the three phase to two phase converter 170. The calculated difference Dd is output to the controller 140.

Similarly, the adder 132 calculates a difference Dq between the q-axis current instruction value Iq1* from the current limiting value setting portion 120 and the q-axis current value Iq1** from the three phase to two phase converter 170. The calculated difference Dq is output to the controller 140.

The controller 140 computes voltage instruction values Vd1, Vq1 according to proportional plus integral (PI) control computation, for example, such that the difference Dd from the adder 130 and the difference Dq from the adder 132 converge to zero. The computed voltage instruction values Vd1, Vq1 are output to the two phase to three phase converter 150.

The two phase to three phase converter 150 performs inverse dq transformation to transform the two phase voltage instruction values Vd1, Vq1 into three phase voltage instruction values Vu1, Vv1, Vw1 of a u-phase, v-phase, and w-phase, based on an angle signal θ feedback from the turning angle sensor 76. The three phase voltage instruction values Vu1, Vv1, Vw1 obtained by the inverse dq transformation are output to the first circuit inverter 160.

The first circuit inverter 160 has six bridge-connected switching elements. Examples of a switching element include a metal-oxide semiconductor field-effect transistor (MOSFET) and an insulated gate bipolar transistor (IGBT). The first circuit inverter 160 drives the switching elements based on a PWM signal supplied from an unillustrated PWM generator, to apply the three phase voltage instruction values Vu1, Vv1, Vw1 from the two phase to three phase converter 150 to the motor 70. Note that since configurations such as the aforementioned three-phase inverter circuit are known techniques, detailed descriptions are omitted.

The current detector 180 detects the three phase currents Iu1, Iv1, Iw1 flowing from the first circuit inverter 160 to the phases of the motor 70. The detected three phase currents Iu1, Iv1, Iw1 are output to both the three phase to two phase converter 170 and the abnormality determination portion 310.

The second circuit controller 200 on the second circuit side has a current instruction value computation portion 210, a current limiting value setting portion 220, adders 230, 232, a controller 240, a two phase to three phase converter 250, and a three phase to two phase converter 270. Note that since configurations and functions of the second circuit controller 200, second circuit inverter 260, and current detector 280 on the second circuit side are the same as the aforementioned first circuit side, detailed descriptions will be omitted.

When the motor controller 30 is activated by turning on an ignition key, for example, in the initial diagnosis, the diagnostic instruction value computation portion 300 executes a diagnostic mode of determining whether the current detectors 180, 280 are normal. In the diagnostic mode, the diagnostic instruction value computation portion 300 supplies a d-axis current instruction value Id1' and a q-axis current instruction value Iq1' used for performing diagnosis of the current detector 180 on the first circuit side to the controller 140 of the first circuit controller 100. Similarly, the diagnostic instruction value computation portion 300 supplies a d-axis current instruction value Id2' and a q-axis current instruction value Iq2' used for performing diagnosis of the current detector 280 on the second circuit side to the controller 240 of the second circuit controller 200. The diagnostic d-axis current instruction value Id1' and other values are previously stored in an unillustrated memory, for example. Note that the diagnostic current instruction values will be described later.

The abnormality determination portion 310 determines whether the current detectors 180, 280 are normal or abnormal, based on the three phase currents Iu1, Iv1, Iw1 and Iu2, Iv2, Iw2 detected by the current detectors 180, 280. In the example embodiment, a total of two diagnoses including a first diagnosis and a second diagnosis are performed.

The motor 70 is configured of a three-phase brushless motor, for example. The motor 70 has two windings 72, 74, and rotates by being driven by at least one of the first circuit inverter 160 and the second circuit inverter 260.

The turning angle sensor 76 faces the rotation axis of the motor 70. The turning angle sensor 76 detects the angle signal θ according to a change in angle of the rotation axis of the motor 70. The detected angle signal θ is output to the two phase to three phase converter 150, the three phase to two phase converter 170, the two phase to three phase converter 250, and the three phase to two phase converter 270. Note that a known angle detector such as a resolver or an MR sensor may be used as the turning angle sensor 76, for example.

Figure 3:
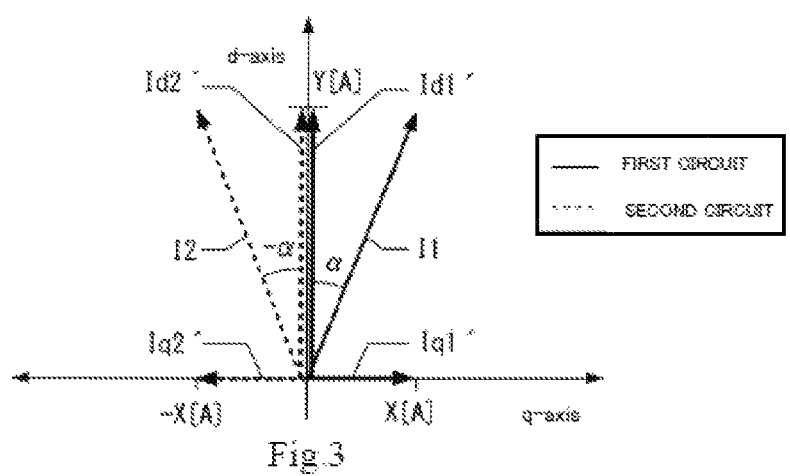
FIG. 3 is a diagram for describing diagnostic current instruction values used for diagnoses of current detectors.

FIG. 3 is a diagram for describing the current instruction values used for diagnoses of the current detector 180 of the first circuit and the current detector 280 of the second circuit. Note that in FIG. 3, the vertical axis represents the d-axis current instruction value, and the horizontal axis represents the q-axis current instruction value.

As shown in FIG. 3, a forced current I1 including the d-axis current instruction value Id1' and q-axis current instruction value Iq1' in "d-axis direction +α" is supplied to the first circuit controller 100. A forced current I2 including the d-axis current instruction value Id2' and q-axis current instruction value Iq2' in "d-axis direction −α" is supplied to the second circuit controller 200.

The d-axis current instruction value Id1' for the first circuit and the d-axis current instruction value Id2' for the second circuit are the same constant value, and are set to +Y[A], for example. The q-axis current instruction value Iq2' for the second circuit is set in opposite phase of the q-axis current instruction value Iq1' for the first circuit. Specifically, the q-axis current instruction value Iq1' for the first circuit is set to X[A], and the q-axis current instruction value Iq2' for the second circuit is set to −X[A].

Thus, in the example embodiment, since the q-axis component is cancelled out by setting the q-axis current instruction value Iq2' in opposite phase (negative) of the q-axis current instruction value Iq1', the q-axis current instruction value can be set to zero. Accordingly, in the diagnoses of the current detector 180 and the like, the motor 70 is not rotated, and the forced currents I1, I2 for diagnosis can be supplied to two different points near the d-axis, so that an abnormality of the current detector 180 and the like can be determined based on the detection results.

Note that the angle α of the forced currents I1, I2 is preferably set larger than 0 degrees and not larger than 10 degrees, for example. This is because while the q-axis current instruction value Iq1' for the first circuit and the q-axis current instruction value Iq2' for the second circuit are set so as to cancel each other out in the example embodiment, variation in the induced voltage constant, resistance, and inductance of the motor 70 may generate a minute torque difference in the motor 70. Hence, by setting a small angle α, even when a motor torque as the q-axis component occurs, the motor torque can be kept as small as possible. Note that information for correcting the torque difference may be pre-stored in a nonvolatile memory or the like, and the torque difference may be suppressed by reading out and using the correction information.

Figure 4:
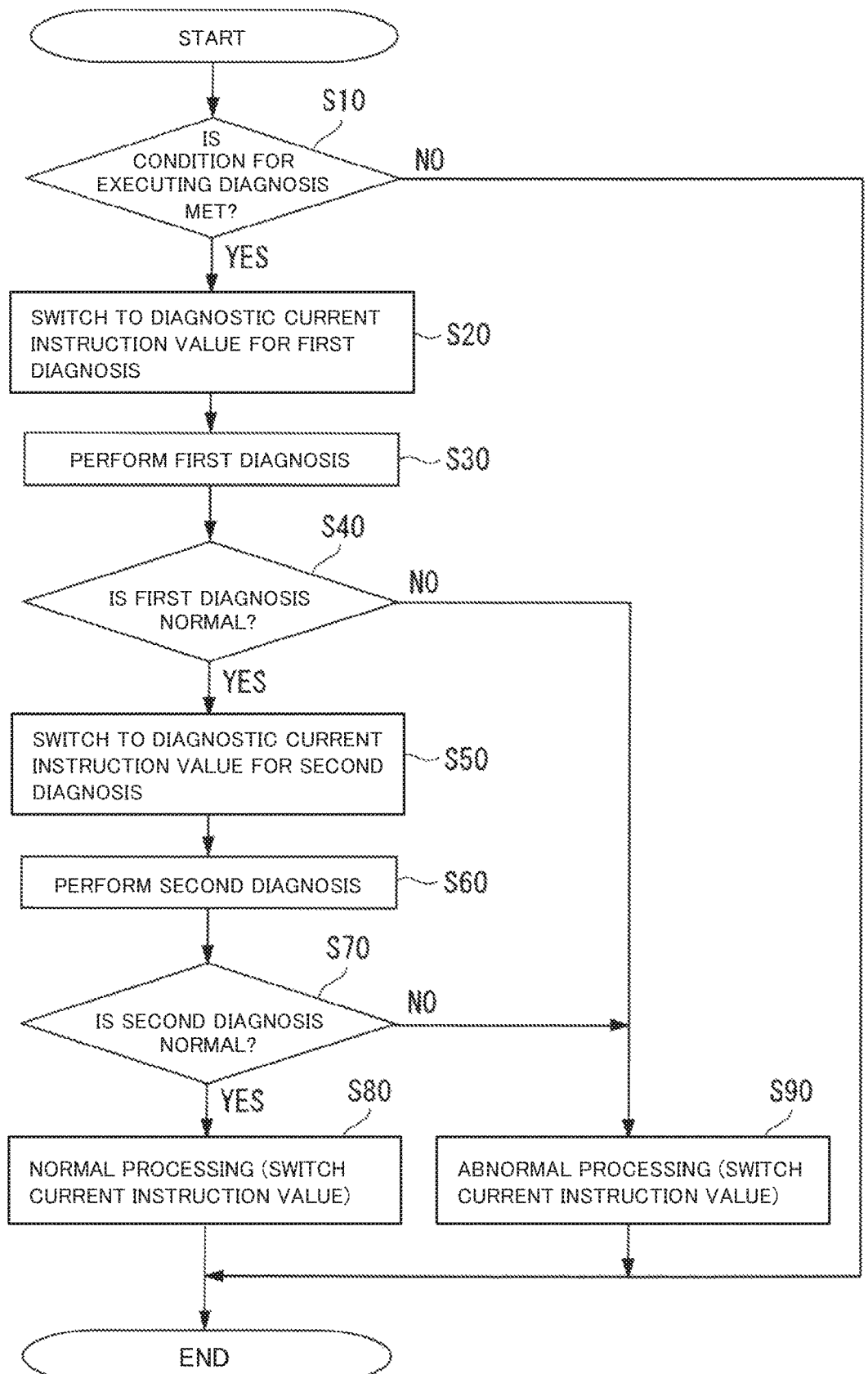
FIG. 4 is a flowchart showing an example of an operation of the electric power steering device during diagnoses of the current detectors.
Figure 5A:
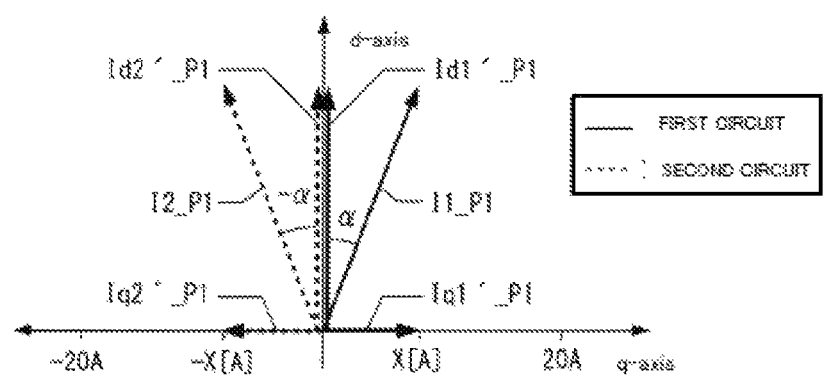
FIG. 5A is a diagram for describing current instruction values used for a first diagnosis.
Figure 5B:
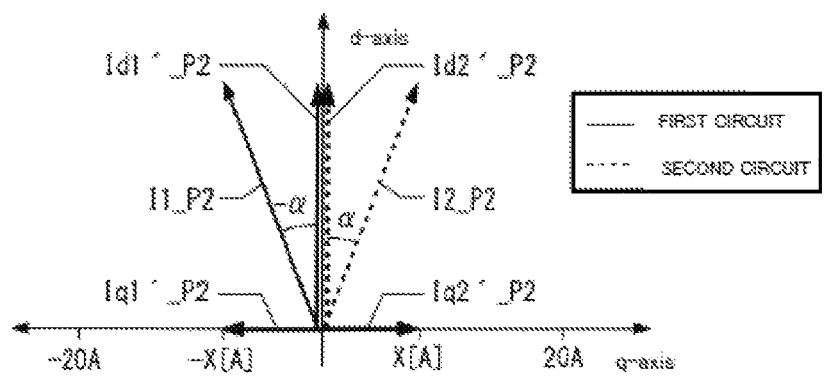
FIG. 5B is a diagram for describing current instruction values used for a second diagnosis.

FIG. 4 is a flowchart showing an example of an operation of the motor controller 30 during the diagnostic mode of diagnosing whether there is an abnormality in the current detector 180 on the first circuit side and in the current detector 280 on the second circuit side. Note that the description will be given of an example where the first diagnosis is made and then the second diagnosis is made in the diagnostic mode. FIG. 5A is a diagram for describing the current instruction values used in the first diagnosis, and FIG. 5B is a diagram for describing the current instruction values used in the second diagnosis.

As shown in FIG. 4, in step S10, immediately after the ignition key is turned on, the diagnostic instruction value computation portion 300 determines whether a condition for executing the diagnostic mode is met. Examples of the condition for executing the diagnostic mode include turning on a power relay, turning on a motor relay, and whether a rotation speed of the motor has dropped to a predetermined speed or lower. Next, the operation proceeds to step S20.

In step S20, the diagnostic instruction value computation portion 300 switches to the diagnostic current instruction value used in the first diagnosis. As shown in FIG. 5A, the diagnostic instruction value computation portion 300 switches to a forced current I1_P1 in "d-axis direction +α" for the first circuit, and switches to a forced current I2_P1 in "d-axis direction −α" for the second circuit. A d-axis current instruction value Id1'_P1 and a q-axis current instruction value Iq1'_P1 are included in the forced current I1_P1, while a d-axis current instruction value Id2'_P1 and a q-axis current instruction value Iq2'_P1 are included in the forced current I2_P1.

Note that as described with reference to FIG. 3, the q-axis current instruction value Iq1'_P1 for the first circuit and the q-axis current instruction value Iq2'_P1 for the second circuit are set opposite in phase. The forced current I1_P1 and forced current I2_P1 for diagnosis (hereinafter also referred to as forced current I1_P1 and the like) are set to 40 A, for example, and are controlled so as to gradually approach the target 40 A from the start of the diagnosis. This is because unless the forced current I1_P1 and the like are set large enough to have tolerance for noise, variation in the detected current due to noise may cause erroneous detection of the forced current I1_P1 and the like, or may disable detection. Note that the values of the forced current I1_P1 and the like for diagnosis are not limited to 40 A, as long as they are values that can avoid erroneous detection. Next, the operation proceeds to step S30.

In step S30, the diagnostic instruction value computation portion 300 performs the first diagnosis. The diagnostic instruction value computation portion 300 outputs the d-axis current instruction value Id1'_P1 and the q-axis current instruction value Iq1'_P1 to the controller 140 of the first circuit controller 100, and also outputs the d-axis current instruction value Id2'_P1 and the q-axis current instruction value Iq2'_P1 to the controller 240 of the second circuit controller 200. Next, the operation proceeds to step S40.

In step S40, the abnormality determination portion 310 acquires currents Iu1_P1, Iv1_P1, Iw1_P1 detected by the current detector 180 by performing the first diagnosis, and determines whether there is an abnormality in the current detector 180 on the first circuit side based on the following conditions (1), (2).

$$|\text{current } Iu1\_P1| + |\text{current } Iv1\_P1| + |\text{current } Iw1\_P1| \geq 20 \text{ A} \quad (1)$$

$$\text{current } Iu1\_P1 + \text{current } Iv1\_P1 + \text{current } Iw1\_P1 \leq 10 \text{ A} \quad (2)$$

The abnormality determination portion 310 computes the sum of absolute values of the currents Iu1_P1, Iv1_P1, Iw1_P1 in "d-axis direction +α" flowing through the phases of the motor 70 detected by the current detector 180, and determines that the current detector 180 on the first circuit side is normal when the computation result is not smaller than the threshold 20 A. Note that the threshold is not limited to 20 A. Since a determination similar to condition (1) can be made with the other condition (2) and later-mentioned conditions (3) to (6), (10), (11), for example, detailed descriptions will be omitted.

Also, in the first diagnosis, the abnormality determination portion 310 acquires currents Iu2_P1, Iv2_P1, Iw2_P1 detected by the current detector 280 by performing the first diagnosis, and determines whether there is an abnormality in the current detector 280 on the second circuit side based on the following conditions (3), (4).

$$|\text{current } Iu2\_P1|+|\text{current } Iv2\_P1|+|\text{current } Iw2\_P1|\geq 20 \text{ A} \tag{3}$$

$$\text{current } Iu2\_P1+\text{current } Iv2\_P1+\text{current } Iw2\_P1\leq 10\text{A} \tag{4}$$

When any one of conditions (1) to (4) is not met, the abnormality determination portion 310 determines that at least one of the current detector 180 of the first circuit and the current detector 280 of the second circuit is abnormal. For example, the abnormality determination portion 310 determines that the current detector 180 is abnormal when conditions (1), (2) are not met after passage of several hundred milliseconds from the start of the diagnosis, and determines that the current detector 280 is abnormal when conditions (3), (4) are not met after passage of several hundred milliseconds from the start of the diagnosis. When it is determined that the current detector 180 or the current detector 280 is abnormal, the operation proceeds to step S90.

In step S90, when it is determined that the current detector 180 of the first circuit is abnormal, the abnormality determination portion 310 gives a warning to prohibit use of the first circuit inverter 160. Similarly, when it is determined that the current detector 280 of the second circuit is abnormal, the abnormality determination portion 310 gives a warning to prohibit use of the second circuit inverter 260. The warning is given by lighting an LED or the like, or displaying contents of the warning on a display portion, for example. The abnormality determination portion 310 also instructs the diagnostic instruction value computation portion 300 to stop output of the forced current I1_P1 and the like for diagnosis.

Meanwhile, when it is determined in step S40 that all of conditions (1) to (4) of the first diagnosis are met, the abnormality determination portion 310 proceeds to step S50 to perform the second diagnosis after the first diagnosis.

In step S50, the diagnostic instruction value computation portion 300 switches to the diagnostic current instruction value used in the second diagnosis. As shown in FIG. 5B, the diagnostic instruction value computation portion 300 switches to a forced current I1_P2 in "d-axis direction −α" for the first circuit, and switches to a forced current I2_P2 in "d-axis direction +a" for the second circuit. A d-axis current instruction value Id1'_P2 and a q-axis current instruction value Iq1'_P2 are included in the forced current I1_P2, while a d-axis current instruction value Id2'_P2 and a q-axis current instruction value Iq2'_P2 are included in the forced current I2_P2. Next, the operation proceeds to step S60.

In step S60, the diagnostic instruction value computation portion 300 performs the second diagnosis. The diagnostic instruction value computation portion 300 outputs the d-axis current instruction value Id1'_P2 and the q-axis current instruction value Iq1'_P2 to the controller 140 of the first circuit controller 100, and also outputs the d-axis current instruction value Id2'_P2 and the q-axis current instruction value Iq2'_P2 to the controller 240 of the second circuit controller 200. Next, the operation proceeds to step S70.

In step S70, the abnormality determination portion 310 acquires currents Iu1_P2, Iv1_P2, Iw1_P2 detected by the current detector 180 by performing the second diagnosis, and determines whether there is an abnormality in the current detector 180 based on the following conditions (5) to (9).

$$|\text{current } Iu1\_P2|+|\text{current } Iv1\_P2|+|\text{current } Iw1\_P2|\geq 20 \text{ A} \tag{5}$$

$$\text{current } Iu1\_P2+\text{current } Iv1\_P2+\text{current } Iw1\_P2\leq 10\text{A} \tag{6}$$

$$|\text{current } Iu1\_P1|+|\text{current } Iu1\_P2|\geq 5\text{A} \tag{7}$$

$$|\text{current } Iv1\_P1|+|\text{current } Iv1\_P2|\geq 5 \text{ A} \tag{8}$$

$$|\text{current } Iw1\_P1|+|\text{current } Iw1\_P2|\geq 5 \text{ A} \tag{9}$$

For example, in conditions (7) to (9), a value that can satisfy the total of two current amplitudes at the time of the first diagnosis and the second diagnosis when "d-axis direction ±a (α=10 degrees)," and that does not cause erroneous detection is set as a threshold.

Accordingly, the abnormality determination portion 310 adds the absolute value of the amplitude of the current Iu1_P1 in "d-axis direction +α" of the u-phase at the time of the first diagnosis and the absolute value of the amplitude of the current Iu1_P2 in "d-axis direction −α" of the u-phase at the time of the second diagnosis, and determines whether the added value is not smaller than 5 A as the threshold. Although the threshold is set to be not smaller than 5 A for tolerance in the example embodiment, the value is not limited thereto. Thus, by using the current amplitude of two different (opposite-phase) points at the time of the first diagnosis and the second diagnosis, detection of the current amplitude at a zero-crossing can be surely avoided. Note that since a determination similar to condition (7) can be made with the other conditions (8), (9) and later-mentioned conditions (12) to (14), for example, detailed descriptions will be omitted.

Also, in the second diagnosis, the abnormality determination portion 310 acquires currents Iu2_P2, Iv2_P2, Iw2_P2 detected by the current detector 280 by performing the second diagnosis, and determines whether there is an abnormality in the current detector 280 according to the following conditions (10) to (14) based on the result of the second diagnosis.

$$|\text{current } Iu2\_P2|+|\text{current } Iv2\_P2|+|\text{current } Iw2\_P2|\geq 20 \text{ A} \tag{10}$$

$$\text{current } Iu2\_P2+\text{current } Iv2\_P2+\text{current } Iw2\_P2\leq 10\text{ A} \tag{11}$$

$$|\text{current } Iu2\_P1|+|\text{current } Iu2\_P2|\geq 5 \text{ A} \tag{12}$$

$$|\text{current } Iv2\_P1|+|\text{current } Iv2\_P2|\geq 5 \text{ A} \tag{13}$$

$$|\text{current } Iw2\_P1|+|\text{current } Iw2\_P2|\geq 5 \text{ A} \tag{14}$$

In step S70, when any one of conditions (5) to (14) is not met, the abnormality determination portion 310 determines that at least one of the current detector 180 of the first circuit and the current detector 280 of the second circuit is abnormal. For example, the abnormality determination portion 310 determines that the current detector 180 is abnormal when conditions (5) to (9) are not met after passage of several hundred milliseconds from the start of the diagnosis, and determines that the current detector 280 is abnormal when conditions (10) to (14) are not met after passage of several hundred milliseconds from the start of the diagnosis. When it is determined that the current detector 180 or the current detector 280 is abnormal, the operation proceeds to step S90.

In step S90, when it is determined that the current detector 180 or the current detector 280 is abnormal, the abnormality determination portion 310 gives a warning to prohibit use of at least one of the first circuit inverter 160 and the second circuit inverter 260, as mentioned earlier.

Meanwhile, in step S70, all of conditions (5) to (14) of the second diagnosis are met, the abnormality determination portion 310 determines that both the current detector 180 of the first circuit and the current detector 280 of the second circuit are normal, and proceeds to step S80.

In step S80, the abnormality determination portion 310 instructs the diagnostic instruction value computation portion 300 to stop output of the forced current I1_P2 and the like for diagnosis, to shift to the normal operation control mode. The diagnostic instruction value computation portion 300 switches to the d-axis and q-axis current instruction values from the current limiting value setting portions 120, 220, and executes the normal operation control mode.

As has been described, according to the example embodiment, in order to diagnose whether an abnormality occurs in the current detector 180 of the first circuit and the current detector 280 of the second circuit, the forced currents I1, I2 for diagnosis are supplied to two different points of the motor 70 having two windings 72, 74, the points including opposite-phase q-axis components and located near the d-axis. Thus, since generation of a motor torque can be cancelled out, rotation of the motor 70 is prevented, and the phase currents Iu1, Iv1, Iw1 and Iu2, Iv2, Iw2 flowing through the motor 70 can be detected.

According to the example embodiment, the second diagnosis is performed in addition to the first diagnosis. In the second diagnosis, the diagnosis is performed by comparing the total of the amplitude of currents in each phase of the motor 70 detected in the first diagnosis and the second diagnosis with a design value thereof. Hence, even at an angle where the current amplitude of a specific phase is OA (zero-crossing), it is possible to surely detect that the current detection value is not fixed to OA. This can improve accuracy of diagnosis for determining an abnormality of the current detector 180 of the first circuit and the current detector 280 of the second circuit.

According to the example embodiment, since a failure in the current detector 180 of the first circuit and the current detector 280 of the second circuit can be determined by the abnormality determination portion 310, it is possible to prevent the problem of continuing control with the failure and supplying an excessively large motor driving force to the motor 70. Moreover, operation of the motor 70 on the faulty current detector 180 side, for example, may be stopped, and the operation of the motor 70 on the normal current detector 280 side, for example, can be used to cover the motor driving force. Hence, a sufficient motor driving force can be maintained. This can improve reliability of the motor controller 30.

Note that the technical scope of the present disclosure is not limited to the above example embodiment, and includes various modifications of the above example embodiment without departing from the gist of the disclosure. Although the current instruction value computation portions 110, 210 are provided for the respective circuits in the example embodiment, the disclosure is not limited to this. For example, the current instruction value computation portions 110, 210 may be configured of a single current instruction value computation portion that outputs a current instruction value to each of the current limiting value setting portions 120, 220 of the corresponding circuit.

Although the diagnostic instruction value computation portion 300 is provided as a separate part for outputting a current instruction value used for diagnosis of the current detectors 180, 280 in the example embodiment, the disclosure is not limited to this. For example, instead of providing the diagnostic instruction value computation portion 300, the current instruction value computation portions 110, 210 of each circuit may have a function of outputting a diagnostic current instruction value. Furthermore, the current instruction value computation portions 110, 210 may be configured of a single current instruction value computation portion, and the current instruction value computation portion may have a function of outputting a diagnostic current instruction value.

Features of the above-described example embodiments and the modifications thereof may be combined appropriately as long as no conflict arises.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A motor controller that controls operation of a motor including two windings, the motor controller comprising:
   a calculator to compute a current instruction value to drive the motor;
   a first motor driver to drive the motor by supplying a first current to one of the two windings based on the current instruction value computed by the calculator;
   a second motor driver to drive the motor by supplying a second current to another of the two windings based on the current instruction value computed by the calculator;
   a first current detector to detect the first current supplied to the motor from the first motor driver; and
   a second current detector to detect the second current supplied to the motor from the second motor driver; wherein
   an initial diagnosis is performed when the motor controller is activated,
   to determine an abnormality of at least one of the first current detector and the second current detector, the calculator supplies a first forced current to the first motor driver, and supplies a second forced current in opposite phase of the first forced current to the second motor driver,
   the calculator supplies a third forced current in opposite phase of the first forced current to the first motor driver, and supplies a fourth forced current in opposite phase of the third forced current to the second motor driver, and
   the motor controller further includes an abnormality determiner to determine an abnormality of at least one of the first current detector and the second current detector, based on: the first forced current in each phase of the motor detected by the first current detector, the second forced current in each phase of the motor detected by the second current detector, the third forced current in each phase of the motor detected by the second current detector, and the fourth forced current in each phase of the motor detected by the second current detector.

2. The motor controller according to claim 1, wherein
the first forced current includes a first d-axis current instruction value and a first q-axis current instruction value;
the second forced current includes a second d-axis current instruction value and a second q-axis current instruction value; and
the second q-axis current instruction value of the second forced current is in opposite phase of the first q-axis current instruction value of the first forced current.

3. The motor controller according to claim 2, wherein the abnormality determiner performs addition using at least one of the first forced current and the second forced current.

4. An electric power steering device that assists a handle operation by a driver, the electric power steering device comprising:
a torque sensor to detect a torque generated by the handle operation;
the motor controller according to claim 3; and
the motor driven by the motor controller.

5. An electric power steering device that assists a handle operation by a driver, the electric power steering device comprising:
a torque sensor to detect a torque generated by the handle operation;
the motor controller according to claim 2; and
the motor driven by the motor controller.

6. The motor controller according to claim 2, wherein
an angle $\alpha$ of the first forced current and the second forced current is set to a value that is larger than zero degrees and about 10 degrees or less.

7. The motor controller according to claim 1, wherein the abnormality determiner performs addition using at least one of the first forced current and the second forced current.

8. An electric power steering device that assists a handle operation by a driver, the electric power steering device comprising:
a torque sensor to detect a torque generated by the handle operation;
the motor controller according to claim 7; and
the motor driven by the motor controller.

9. An electric power steering device that assists a handle operation by a driver, the electric power steering device comprising:
a torque sensor to detect a torque generated by the handle operation;
the motor controller according to claim 1; and
the motor driven by the motor controller.

* * * * *